(12) United States Patent
Goang et al.

(10) Patent No.: US 6,731,366 B1
(45) Date of Patent: May 4, 2004

(54) LIQUID CRYSTAL DISPLAY STRUCTURES AND METHODS OF FORMING THE SAME

(75) Inventors: Dong-Yuan Goang, Chung Li (TW); Chich-Jung Wu, Pingtung (TW); Dou-I Chen, Nantou (TW)

(73) Assignee: Allied Material Technology Corp. (TW)

( * ) Notice: Subject to any disclaimer, the term of this patent is extended or adjusted under 35 U.S.C. 154(b) by 358 days.

(21) Appl. No.: 09/695,411

(22) Filed: Oct. 25, 2000

(51) Int. Cl.⁷ .............................................. G02F 1/1335
(52) U.S. Cl. ........................................ 349/155; 349/155
(58) Field of Search .............................. 349/106, 110, 349/155, 44; 438/30

(56) References Cited

U.S. PATENT DOCUMENTS

| | | | | |
|---|---|---|---|---|
| 5,220,446 A | * | 6/1993 | Rho ........................... | 349/138 |
| 5,499,128 A | * | 3/1996 | Hasegawa et al. ........... | 349/155 |
| 6,057,900 A | * | 5/2000 | Ono et al. ................... | 349/110 |
| 6,078,378 A | * | 6/2000 | Lu et al. ..................... | 349/155 |
| 6,275,280 B1 | * | 8/2001 | Kajita et al. ................. | 349/155 |
| 6,373,540 B1 | * | 4/2002 | Munakata ................... | 349/117 |
| 6,396,559 B1 | * | 5/2002 | Kishimoto et al. .......... | 349/156 |
| 6,466,281 B1 | * | 10/2002 | Huang et al. ................. | 349/44 |
| 6,525,791 B1 | * | 2/2003 | Tsuda et al. ................. | 349/106 |

FOREIGN PATENT DOCUMENTS

| JP | 3-167524 | 7/1991 |
|---|---|---|
| JP | 4-093924 | 3/1992 |
| JP | 6-059228 | 3/1994 |
| JP | 8-286194 | 11/1996 |
| JP | 9-101544 | 4/1997 |
| JP | 9-292633 | 11/1997 |
| JP | 10-062789 | 3/1998 |
| JP | 11-142884 | 5/1999 |
| JP | 2000-155336 | 6/2000 |
| JP | 2000-206537 | 7/2000 |

* cited by examiner

*Primary Examiner*—Tarifur R. Chowdhury
*Assistant Examiner*—P. R. Akkapeddi
(74) *Attorney, Agent, or Firm*—Pepper Hamilton LLP

(57) ABSTRACT

Liquid crystal display (LCD) structures and methods for forming the same. The black matrix and the color filter layer of the LCD are moved from color filter substrate to TFT substrate to form a color filter on TFT (COT) structure. Besides, the spacers are composed of photoresist or color photoresist can be located on portions of areas covered by the black matrix to maximize the aperture ratio.

36 Claims, 9 Drawing Sheets

LIQUID CRYSTAL DISPLAY STRUCTURES AND METHODS OF FORMING THE SAME

BACKGROUND OF THE INVENTION

1. Field of Invention

The present invention relates to liquid crystal display (LCD) structures and methods of forming them. More particularly, the present invention relates to LCD structures of integrating a black matrix and a color filter into a substrate having a control circuit thereon and methods of forming the same.

2. Description of Related Art

Liquid crystal display (LCD) has many advantages over other conventional types of displays including high picture quality, small volume occupation, lightweight, low voltage driven and low power consumption. Hence, LCD is widely used in small portable televisions, mobile telephones, video recording units, notebook computers, desktop monitors, projector televisions and so on. LCD gradually replaces conventional cathode ray tube (CRT) as a mainstream display unit.

The main part of LCD is liquid crystal (LC) unit composed of two parallel transparent substrates and LC sealed therein. The mainstream of the LCD is thin film transistor (TFT) LCD. The fabrication processes of a TFT-LCD can be divided into four parts: TFT array, process, color filter (CF) process, LC cell assembly process, liquid crystal module (LCM) process.

The TFT array process is used to fabricate a TFT substrate. Each TFT respectively aligns with one pixel electrode. The CF process is used to fabricate color filter substrate. A color filter layer composed of different color filter sheet is on the color filter substrate, and a black matrix layer surrounds each color filter sheet.

The LC cell assembly process is used to parallel assembles TFT substrate and CF substrate, and bead spacers spread between them to maintain a fixed distance, i.e. cell gap, between TFT substrate and CF substrate. LC is injected into the cell gap then the injection opening is sealed. Basically, each pixel electrode is respectively corresponding to one color filter sheet, and the black matrix layer covers on TFTs and metal lines that connect different TFT.

The LCM process is used to attach a polarizer to a panel, and electrically connect driver IC and panel circuit. Then a reflector and a back-light are assembled on the panel. After a burn-in step, the LCM process is finished.

Generally speaking, the direction of liquid crystal molecule axes, which are controlled by TFT, determines whether each pixel is pervious to light or not. The color of each pixel is determined by the color of color filter sheet. For example, when light passes through a red color filter sheet, a red spot is shown on the panel. Mixing red, green and blue colors can show full-color images.

Since the molecular axes of liquid crystal molecules, which are between pixel electrodes and color filter sheets, have to be controlled precisely, the color filter and the TFT substrate must be aligned precisely. The tolerable error of alignment is only within several micron meters.

The heat coefficients of color filter substrate and TFT substrate are different, hence the precise alignment of pixel electrodes and color filter sheets is hard to achieve. Decreasing the product yield and increasing the production cost are caused by this problem. With growing size of substrates, the problem is getting serious. Therefore, light leakage and coin mura on panel is produced. But for increasing the size of black matrix to increase the alignment precision, the color contrast and brightness of LCD is decreased.

Another problem is the random distribution of bead spacers. The bead spacers may block some of the pixel area. Hence the aperture ratio of LCD is decreased. For smaller pixel area or for high-resolution panel, the problem is more serious.

SUMMARY OF THE INVENTION

An object of the invention is to provide a liquid crystal display structure, wherein a black matrix and a color filter layer both are on a control circuit substrate and pixel electrodes are on the color filter layer to increase the align preciseness of the color filter layer and the pixel electrodes. Besides, photoresist spacers are used to replace the conventional bead spacers to increase the brightness and color contrast of a liquid crystal display.

The liquid crystal display structure comprises a first substrate having a control circuit on it, and a black matrix layer, a color filter layer, a pixel electrode layer, a plurality of photoresist spacers, a liquid crystal layer, a common electrode and a second substrate are in turn on it.

A plurality of openings are in the black matrix layer to expose the first substrate. The color filter layer is composed of a plurality of color filter sheets aligning with each opening. Each pixel electrode aligns with each color filter sheet. The photoresist spacers are located on portions of areas covered by the black matrix, and their hardness is preferred to be about 2H to about 4H and their height is preferred to be about 1 to about 10 μm. The photoresist spacers also can be composed of multi-layered color photoresist.

Another object of the invention is to provide methods of forming a liquid crystal display to increase alignment preciseness between color filter sheets and pixel electrodes, and photoresist spacers are used to replace conventional bead spacers.

Accordingly, in an embodiment, a black matrix layer is formed on a first substrate having a control circuit thereon. A plurality of openings are formed in the black matrix layer to expose the first substrate. A color filter layer is formed on the black matrix layer. A plurality of pixel electrodes are formed on the color filter to align with each of the openings. A plurality of photoresist spacers are formed on the first substrate to be located on portions of areas covered by the black matrix. The first substrate and a second substrate having a common electrode thereon are parallel assembled, wherein the photoresist spacers and the common electrode are between the first substrate and the second substrate. A liquid crystal layer is formed between the first substrate and the second substrate. The order of the step of forming the photoresist spacers and the step of the pixel electrodes can be exchanged.

In another embodiment, a black matrix layer is formed on a first substrate having a control circuit thereon. A plurality of openings are formed in the black matrix layer to expose the first substrate. A color filter layer is formed on the black matrix layer. A plurality of pixel electrodes are formed on the color filter layer to align with each of the openings. A plurality of photoresist spacers are formed on a second substrate having a common electrode thereon the first substrate and the second substrate are parallel assembled, wherein the photoresist spacers and the pixel electrodes are between the first substrate and the second substrate. A liquid crystal layer is formed between the first substrate and the second substrate.

A further object of this invention is to provide a method of forming a liquid crystal display, wherein multi-layered color photoresist are stacked to form photoresist spacers.

In this embodiment, a black matrix layer is formed on a first substrate having a control circuit thereon. A plurality of first, second and third openings are formed in the black matrix layer to expose the first substrate. A first color photoresist is formed on the first substrate. The first color photoresist is patterned to form a plurality of first filter sheets aligning with each of the first openings and a plurality of first spacers located on portions of areas covered by the black matrix. A second color photoresist is formed on the first substrate. The second color photoresist is patterned to form a plurality of second filter sheets aligning with each of the second openings and a plurality of second spacers overlapping with the first spacers. A third color photoresist is formed on the first substrate. The third color photoresist is patterned to form a plurality of third filter sheets aligning with each of the third openings and a plurality of third spacers overlapping with the second spacers. A plurality of pixel electrodes are respectively formed on the first, second and third filter sheets. The first substrate and a second substrate having a common electrode thereon are parallel assembled, wherein the photoresist spacers and the common electrode are between the first substrate and the second substrate. A liquid crystal layer is formed between the first substrate and the second substrate.

As embodied and broadly described herein, the invention provides liquid crystal structures and methods of forming the same, wherein the black matrix and the color filter are moved from the color substrate to the control circuit substrate. Since the alignment preciseness is mostly controlled by photolithography, the alignment error can be greatly reduced to below micron meter. Moreover, the photoresist spacers are located on portions of areas covered by the black matrix, the brightness and the color contrast of the liquid crystal display can be highly raised. Beside, the color photoresist is also used to form spacers, the production cost can be largely reduced and the production yield can be largely promoted.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Embodiment 1

FIGS. 1A–1D are cross-sectional views schematically illustrating a fabrication process for forming a thin film transistor liquid crystal display according to a first preferred embodiment of this invention.

Figure 1A:
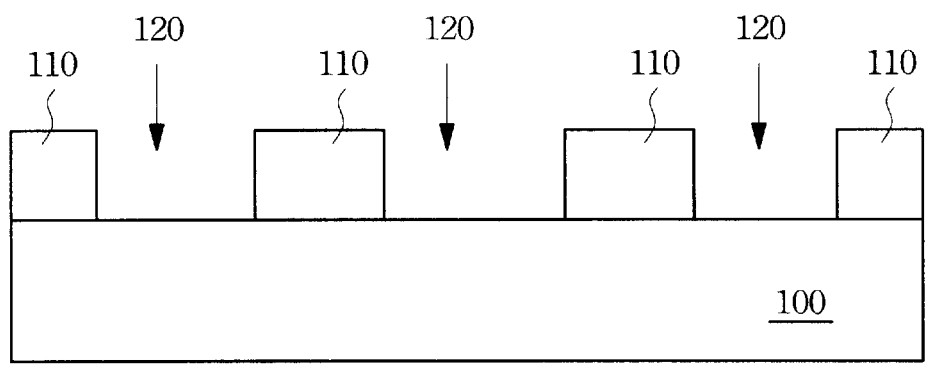
FIGS. 1A–1D are cross-sectional views schematically illustrating a fabrication process for forming a thin film transistor liquid crystal display according to a first preferred embodiment of this invention.

In FIG. 1A, a black matrix layer 110 is formed on a first substrate 100 having a TFT circuit thereon. The black matrix layer 110 is patterned to cover TFTs and metal lines of the TFT circuit and openings 120 are formed therein. Each opening 120 is corresponding to a pixel. The black matrix layer 110 is a material such as chromium/chromium oxide, oxy-resin or black resin. The black matrix layer 110 is formed by a method such as physical vapor deposition or coating followed by patterning.

Figure 1B:
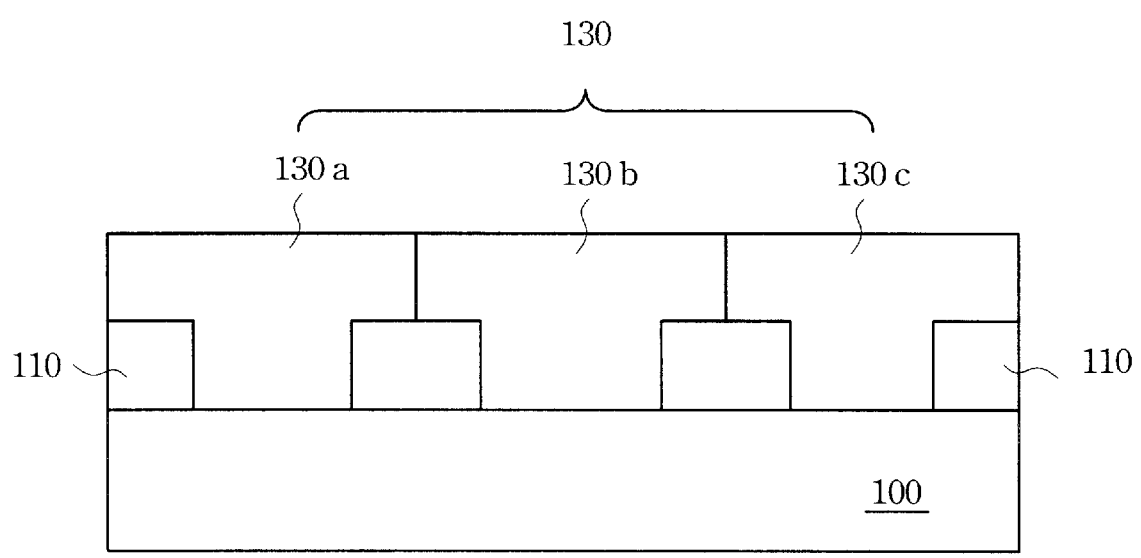
Figure 1:
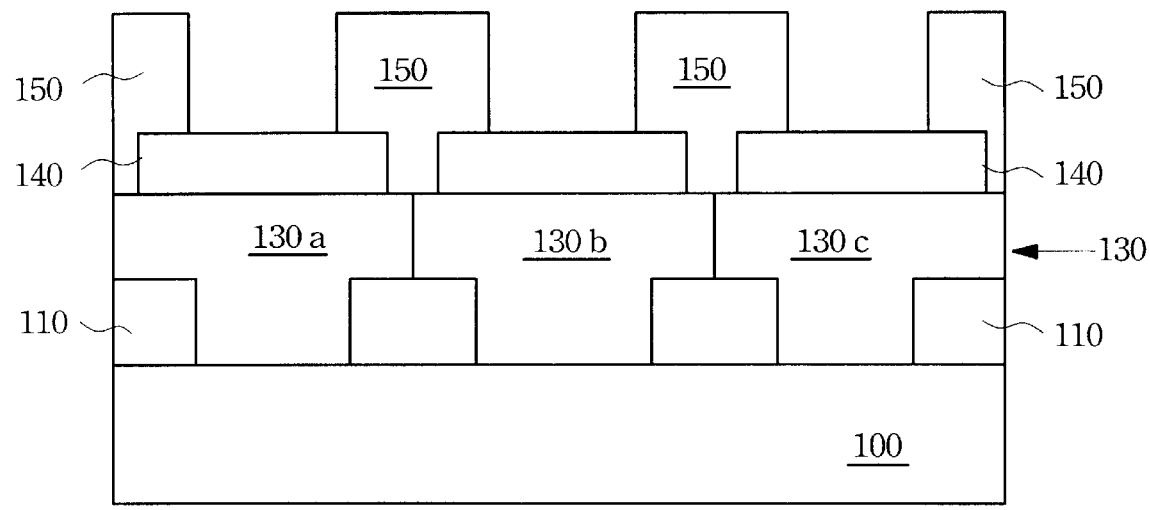
Figure 1:
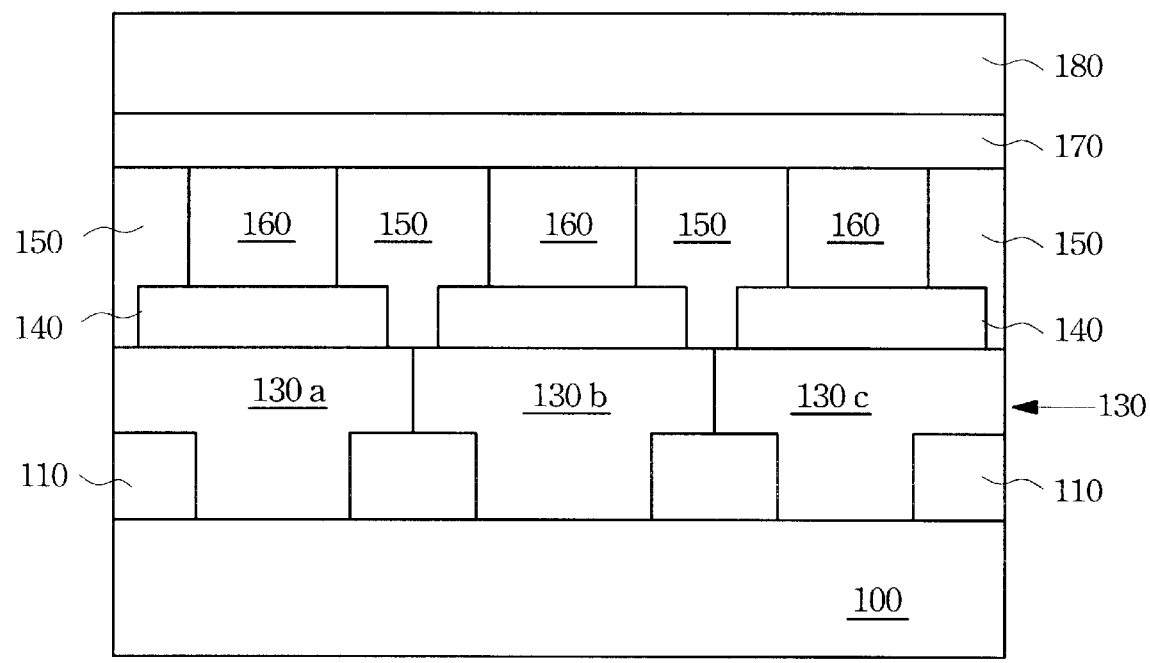

In FIG. 1B, a color filter layer 130 is formed on the black matrix layer 110. The color filter layer 130 is composed of color filter sheets 130a, 130b and 130c of various colors. Each color filter sheet 130a, 130b and 130c aligns with each opening 120 to increase the color contrast between adjacent pixels.

In FIG. 1C, pixel electrodes 140 are formed to respectively align with each opening 120. Pixel electrodes 140 are transparent. For example, a material of pixel electrodes 140 is indium tin oxide (ITO). For example, sputtering a transparent conductive layer then followed by photolithography forms the pixel electrodes 140.

A photoresist layer is formed to cover pixel electrodes 140. The photoresist layer is patterned to form spacers 150 on portions of black matrix 110 to maximize the aperture ratio. The height of spacers 150 is preferred to be 1–10 μm, and the hardness of spacers 150 is preferred to be 2H–4H to maintain a constant value of the cell gap. A material of the photoresist layer is, for example, acrylic resin or epoxy-resin such as OPTMER NN 500 or OPTMER NN700 sold by JSR Company. For example, the patterning method comprises photolithography or exposure followed by etching.

In FIG. 1D, a common electrode 170 is formed on a second substrate 180. A material of the second substrate 180 is, for example, glass or quartz. The common electrode 170 is transparent, and a material of the common electrode 170 is, for example, indium tin oxide. The formation method of the common electrode 170 is, for example, sputtering followed by etching.

The first substrate 100 and the second substrate 180 are parallel assembled together, and the common electrode 170 and the spacers 150 are located between them. The lateral side of the cell gap between the first substrate 100 and the second substrate 180 is sealed except reserving an opening (not shown in the FIG. 1D) for liquid crystal injecting.

Liquid crystal is injected into the cell gap from the lateral opening to form a liquid crystal layer 160. The opening is sealed. The process of manufacturing TFT-LCD is completed.

From embodiment 1 described above, the black matrix and the color filter layer are moved to TFT substrate to form a color filter on TFT (COT) structure. Because all precise alignments are done on the TFT substrate, no alignment considerations are needed when the first substrate and the second substrate are assembled. Hence the COT structure can largely increase the production yield; moreover, it can be applied on the production techniques of fourth generation or above.

Besides, the spacers are composed of photoresist, hence the position of spacers can be defined on black matrix to increase the aperture ratio of LCD and thus the brightness and color contrast of LCD.

Embodiment 2

FIGS. 2A–2D are cross-sectional views schematically illustrating a fabrication process for forming a thin film transistor liquid crystal display according to a second preferred embodiment of this invention.

Figure 2A:
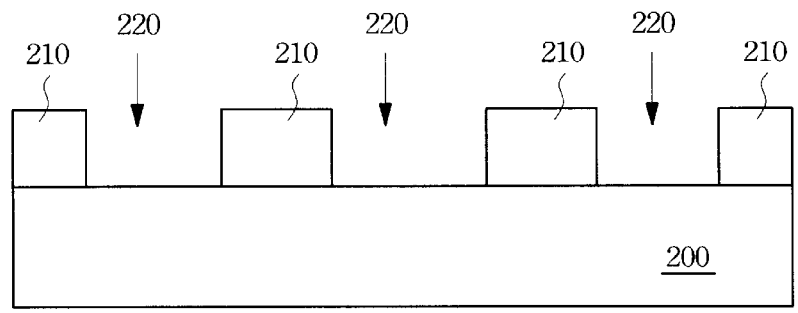
FIGS. 2A–2D are cross-sectional views schematically illustrating a fabrication process for forming a thin film transistor liquid crystal display according to a second preferred embodiment of this invention.

In FIG. 2A, a black matrix layer 210 is formed on a first substrate 200 having a TFT circuit thereon. The black matrix layer 210 is patterned to cover TFTs and metal lines of the TFT circuit and openings 220 are formed therein. Each opening 220 is corresponding to a pixel. The black matrix layer 210 is a material such as chromium/chromium oxide, oxy-resin or black resin. The black matrix layer 210 is formed by a method such as physical vapor deposition or coating then followed by patterning.

Figure 2B:
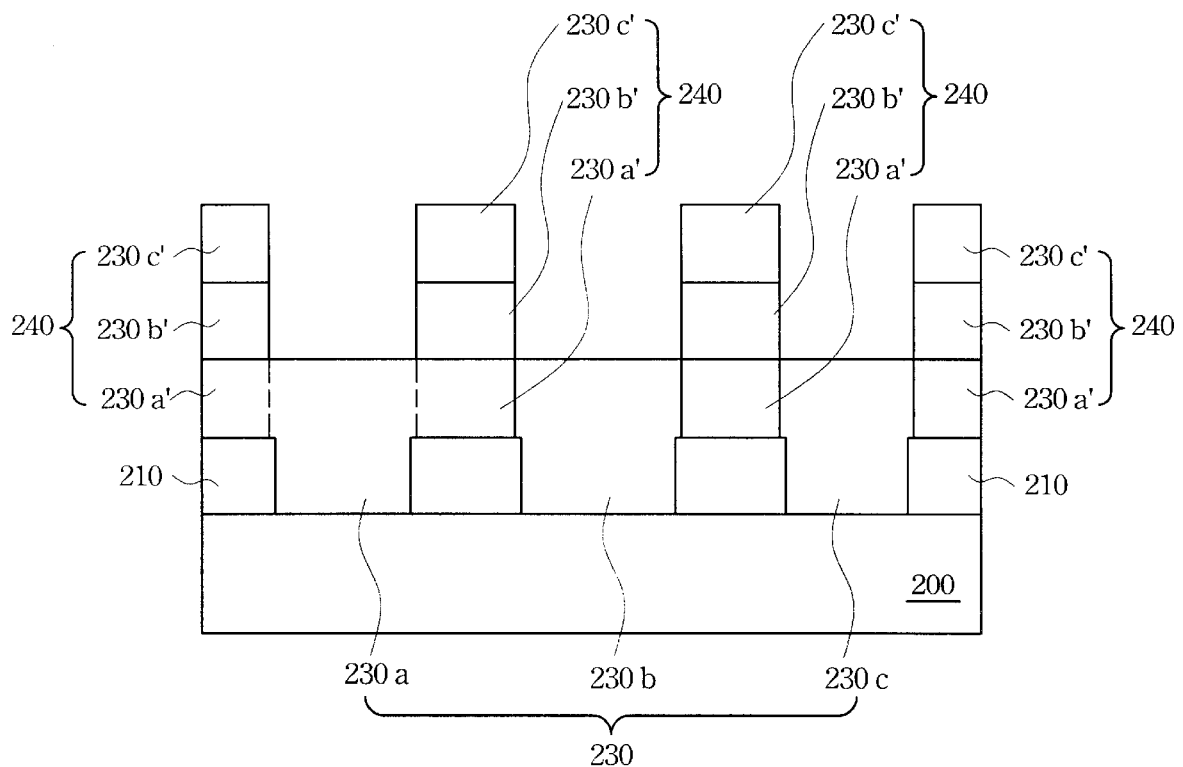
Figure 2:
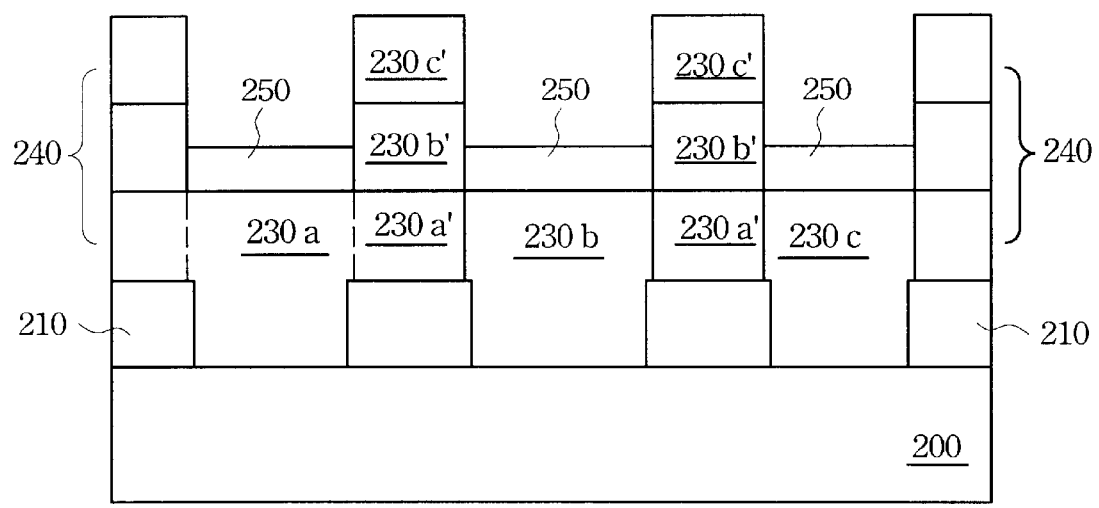
Figure 2:
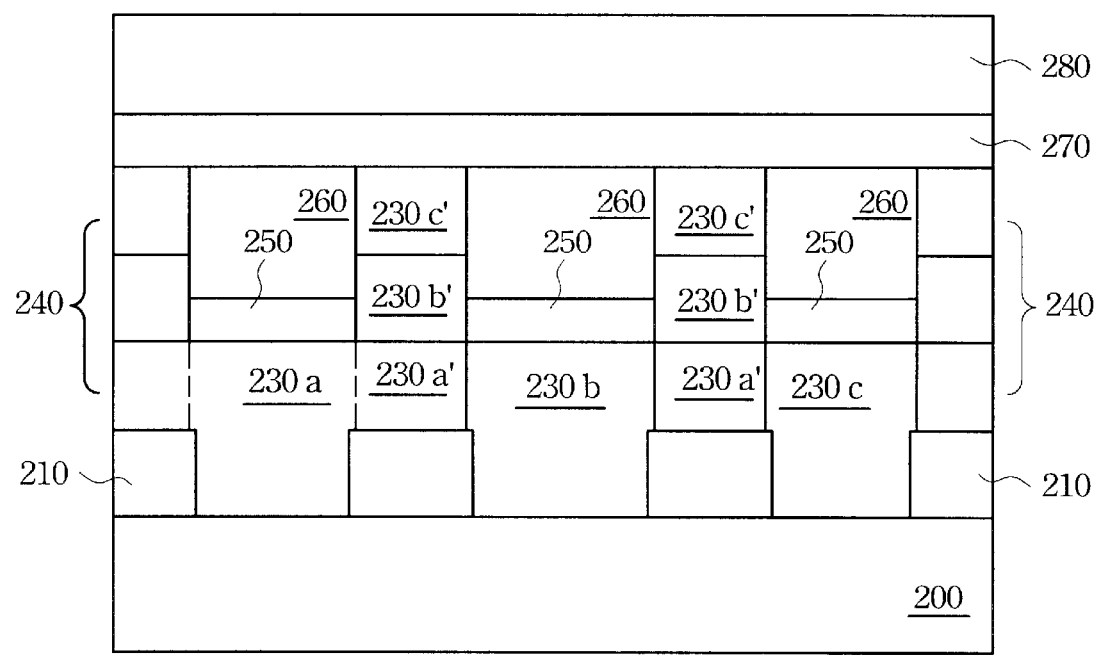

In FIG. 2B, a color filter layer 230 is formed on the black matrix layer 210. The color filter layer 230 is composed of color filter sheets 230a, 230b and 230c of various colors such as red, green and blue for full-colors LCD. Each color filter sheet 230a, 230b and 230c aligns with each opening 220 to increase the color contrast between adjacent pixel. First color spacers 230a', second color spacers 230b' and third color spacers 230c' are stacked on portions of black matrix 210 to form color spacers 240. The process is described as below.

A first color photoresist layer is formed on the first substrate 200. The first color photoresist layer is patterned to simultaneously form first color filter sheets 230a located on portions of openings 220 and first color spacers 230a' on portions of the black matrix 210. Similarly, a second color filter layer is formed on the first substrate 200. The second color photoresist layer is patterned to simultaneously form second color filter sheets 230b located on another portions of openings 220 and second color spacers 230b' on first color spacers 230a'. Finally, a third color filter layer is formed on the first substrate 200. The third color photoresist layer is patterned to simultaneously form third color filter sheets 230c located on rest of openings 220 and third color spacers 230c' on second color spacers 230b'. Hence the first color spacers 230a', the second color spacers 230b' and the third color spacers 230c' are stacked to form the color spacers 240 on portions of black matrix 210.

In FIG. 2C, pixel electrodes 250 are respectively formed on color filter sheets 230a, 230b and 230c. A material of pixel electrodes 250 is, for example, indium tin oxide. A formation method of pixel electrodes 250 comprises steps as follow. A conformal transparent conductive layer is deposited on the color filter layer 320 and color spacers 240. A patterned photoresist layer is formed on the conductive layer to cover portions of conductive layer on color filter sheets 230a, 230b and 230c. The exposed portions of the conductive layer are removed to form pixel electrodes 250. The patterned photoresist layer is subsequently removed. A removal method of the conductive layer is, for example, wet etching.

In FIG. 2D, a common electrode 270 is formed on a second substrate 280. A material of the second substrate 280 is, for example, glass or quartz. The common electrode 270 is transparent, and a material of the common electrode 270 is, for example, indium tin oxide. The formation method of the common electrode 270 is, for example, sputtering.

The first substrate 200 and the second substrate 280 are parallel assembled together, and the common electrode 270 and the spacers 250 are located between them. The lateral side of the cell gap between the first substrate 200 and the second substrate 280 is sealed except reserving an opening (not shown in the FIG. 2D) for liquid crystal injecting.

Liquid crystal is injected into the cell gap between the first substrate 200 and the second substrate 280 from the lateral opening to form a liquid crystal layer 260. The opening is sealed. The process of manufacturing TFT-LCD is completed.

From embodiment 2 described above, the black matrix and the color filter layer are moved to TFT substrate to form a color filter on TFT (COT) structure. Because all precise alignments are done on the TFT substrate, no alignment considerations are needed when the first substrate and the second substrate are assembled. Hence the COT structure can largely increase the production yield; moreover, it can be applied on the production techniques of fourth generation or above.

In Embodiment 2, the color filter layer and color spacers are simultaneously formed, hence the step of forming spacers can be omitted to reduce production cost and increase production yield. Besides, the color spacers are located on black matrix to maximize the aperture ratio. Therefore, the brightness and contrast of LCD can be largely increased.

Embodiment 3

Figure 3:
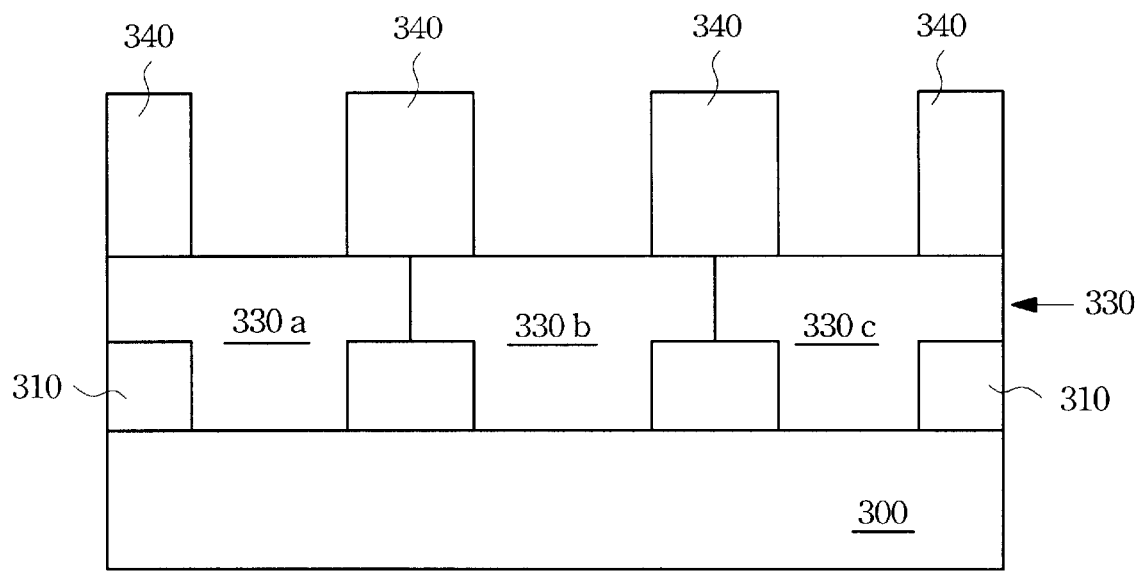
FIGS. 3A–3B are cross-sectional views schematically illustrating a fabrication process for forming a thin film transistor liquid crystal display according to a third preferred embodiment of this invention.
Figure 3:
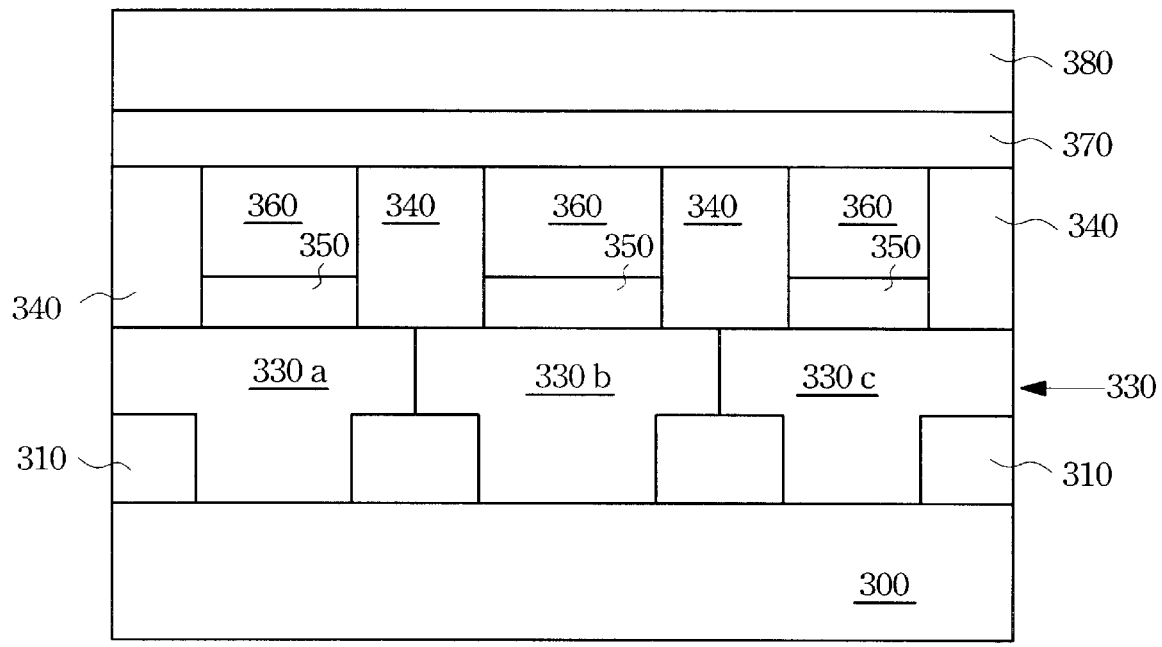

FIGS. 3A–3B are cross-sectional views schematically illustrating a fabrication process for forming a thin film transistor liquid crystal display according to a third preferred embodiment of this invention. Photoresist spacers here replace the color spacers in embodiment 2.

In FIG. 3A, the process of forming a black matrix layer 310 is as same as Embodiment 2 (Please refer to the illustration of FIG. 2A). Without forming color spacers 240 on portions of the black matrix layer 210 in FIG. 2B, the process of forming a color filter layer 330 is basically similar to the process of forming the color filter layer 230 in Embodiment 2. Hence only color filter sheets 330a, 330b and 330c are formed in FIG. 3A.

A photoresist layer is formed to cove the color filter layer 330. The photoresist layer is patterned to form spacers 340. Spacers 340 are located on portions of black matrix 310 to maximize the aperture ratio of LCD. The preferred height of spacers 340 is 1–10 μm, and a preferred hardness of spacers 340 is 2H–4H in pencil hardness to maintain a constant value of cell gap. A material of the photoresist is, for example, acrylic resin or epoxy resin such as OPTMER NN 500 or OPTMER NN700 sold by JSR Company. For example, the patterning method comprises photolithography or exposure followed by etching.

In FIG. 3B, the subsequent process is as same as Embodiment 2. Pixel electrodes 350 are formed on the color filter layer 330. A common electrode 370 is formed on a second substrate 380. The first substrate 300 and the second substrate 380 are parallel bound together, and the common electrode 370 and the spacers 340 are located between them. The lateral side of the cell gap between the first substrate 300 and the second substrate 380 is sealed except reserving an opening (not shown in the FIG. 3B) for liquid crystal injecting.

Liquid crystal is injected into the cell gap between the first substrate 300 and the second substrate 380 from the lateral opening to form a liquid crystal layer 360. The opening is sealed. The process of manufacturing TFT-LCD is completed.

From embodiment 3 described above, the black matrix layer and the color filter layer are moved to TFT substrate to form a color filter on TFT (COT) structure. Because all precise alignments are done on the TFT substrate, no alignment considerations are needed when the first substrate and the second substrate are assembled. Hence the COT structure can largely increase the product yield; moreover, it can be applied on the production techniques of fourth generation or above.

Besides, the spacers are composed of photoresist, hence the position of spacers can be defined on the black matrix layer to increase the aperture ratio of LCD and thus the brightness and color contrast of LCD.

Embodiment 4

FIGS. 4A–4D are cross-sectional views schematically illustrating a fabrication process for forming a thin film transistor liquid crystal display according to a fourth preferred embodiment of this invention.

Figure 4:
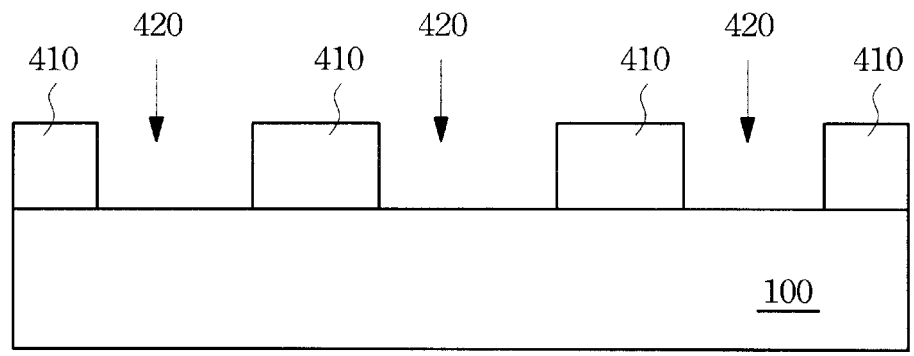
FIGS. 4A–4D are cross-sectional views schematically illustrating a fabrication process for forming a thin film transistor liquid crystal display according to a fourth preferred embodiment of this invention.
Figure 4:
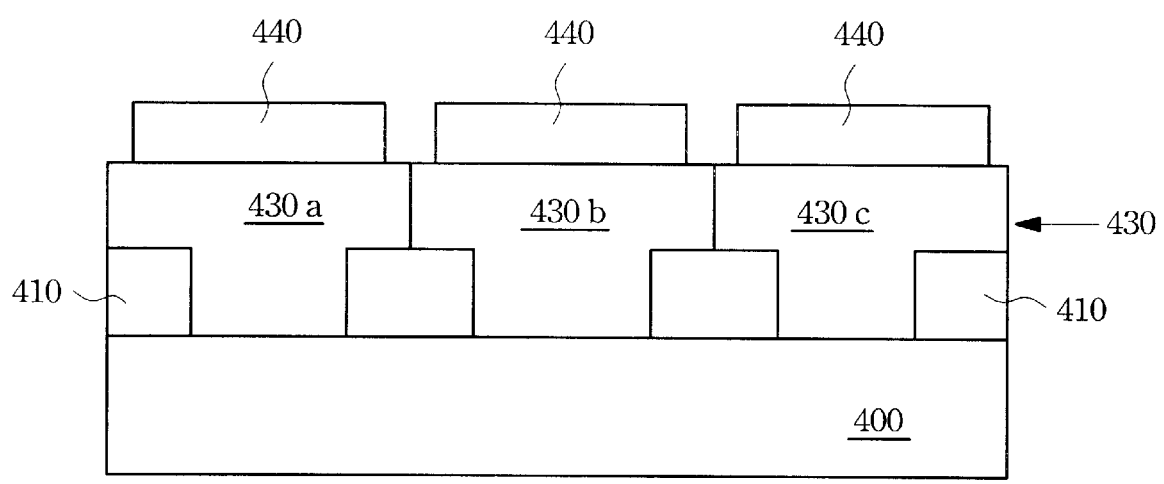
Figure 4:
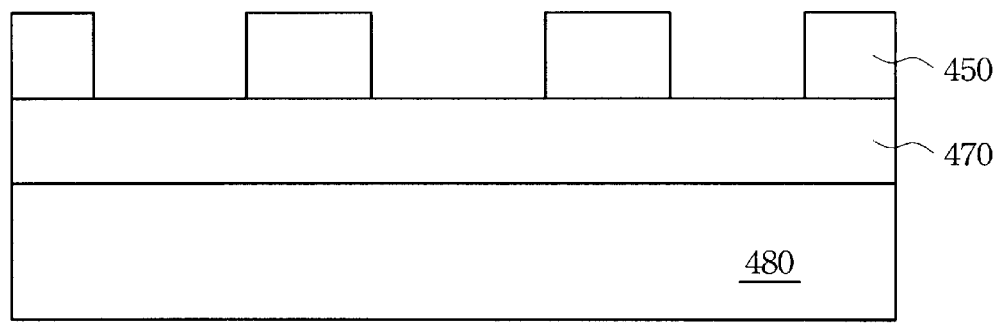
Figure 4:
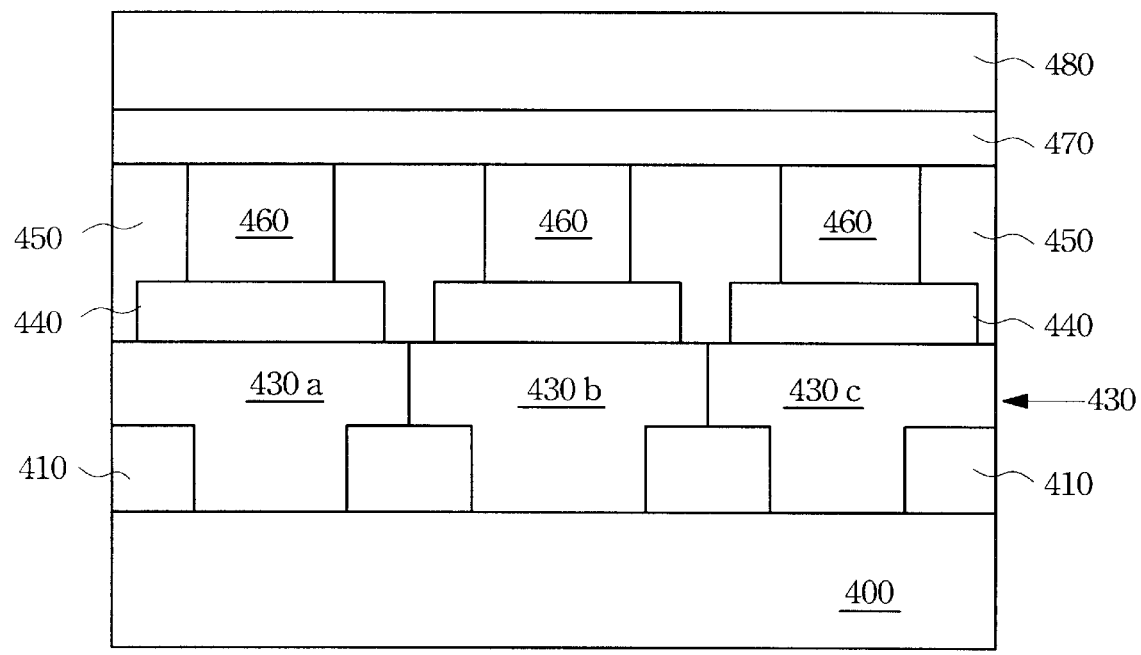

In FIG. 4A, a black matrix layer 410 is formed on a first substrate 400 having a TFT circuit thereon. The black matrix layer 410 is patterned to cover TFTs and metal lines of the TFT circuit and openings 420 are formed therein. Each opening 420 is corresponding to a pixel. The black matrix layer 410 is a material such as chromium/chromium oxide, oxy-resin or black resin. The black matrix layer 410 is formed by a method such as physical vapor deposition or coating then followed by patterning.

In FIG. 4B, a color filter layer 430 is formed on the black matrix layer 410. The color filter layer 430 is composed of color filter sheets 430a, 430b and 430c of various colors. Each color filter sheet 430a, 430b and 430c aligns with each opening 420 to increase the color contrast between adjacent pixels.

Pixel electrodes 440 are formed to align with each opening 420 respectively. Pixel electrodes 440 are transparent. For example, a material of pixel electrodes 440 is indium tin oxide (ITO). For example, sputtering a transparent conductive layer then followed by photolithography forms the pixel electrodes 440.

In FIG. 4C, a common electrode 470 is formed on a second substrate 480. A material of the second substrate 480 is, for example, glass or quartz. The common electrode 470 is transparent, and a material of the common electrode 470 is, for example, indium tin oxide. The formation method of the common electrode 470 is, for example, sputtering.

A photoresist layer is formed to cover common electrode 470. The photoresist layer is patterned to form spacers 450. The height of spacers 450 is preferred to be 1–10 μm, and the hardness of spacers 450 is preferred to be 2H–4H (pencil hardness) to maintain a constant value of the cell gap. A material of the photoresist is, for example, acrylic resin or epoxy resin such as OPTMER NN 500 or OPTMER NN700 sold by JSR Company. For example, the patterning method comprises photolithography or exposure followed by etching.

In FIG. 4D, the first substrate 400 and the second substrate 480 are parallel bound together, and the pixel electrodes 440 and the spacers 450 are located between them. The lateral side of the cell gap between the first substrate 400 and the second substrate 480 is sealed except reserving an opening (not shown in the FIG. 4D) for liquid crystal injecting.

Liquid crystal is injected into the cell gap between the first substrate 400 and the second substrate 480 from the lateral opening to form a liquid crystal layer 460. The opening is sealed. The process of manufacturing TFT-LCD is completed.

From embodiment 4 described above, the black matrix and the color filter layer are moved to TFT substrate to form a color filter on TFT (COT) structure. Because all precise alignments are done on the TFT substrate, no alignment considerations are needed when the first substrate and the second substrate are assembled. Hence the COT structure can largely increase the production yield; moreover, it can be applied on the production techniques of fourth generation or above.

In Embodiment 1, The fabrication steps number on the second substrate is less than the fabrication steps number on the first substrate. Hence the locations of spacers are moved from the first substrate in Embodiment 1 to the second substrate in this Embodiment, and the fabrication steps number on the first substrate is thus decreased. Also, the burden of production yield is transferred from the first substrate to the second substrate to increase the production yield of the first substrate. Besides, the process window of the assembly step in FIG. 4D is looser. The process window of the assembly step is about 10–20 μm. However, the process window of the $3.5^{th}$ generation of LCD is only about 4–5 μm. Therefore the final production yield is still remained or even increased.

Embodiment 5

Figure 5:
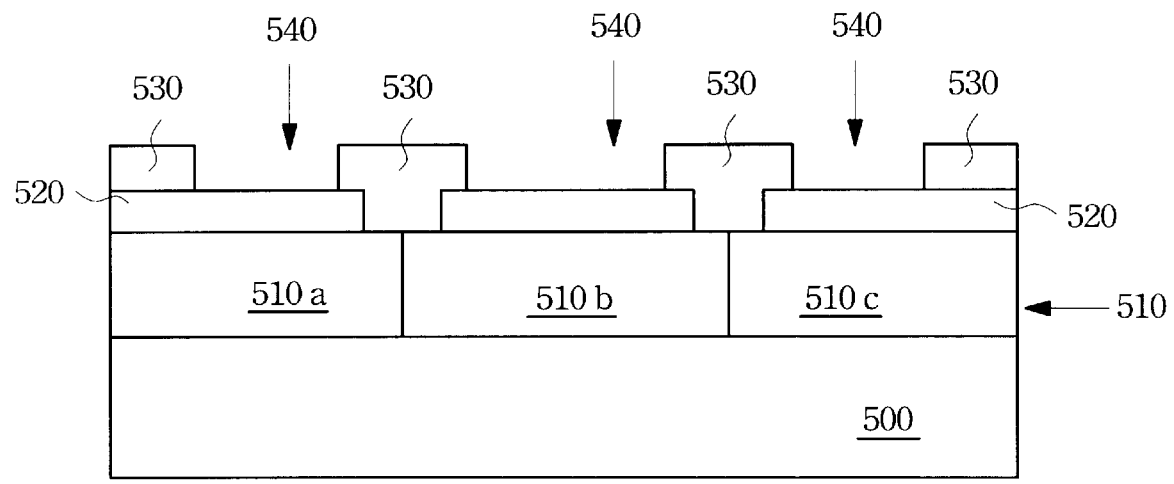
FIGS. 5A–5C are cross-sectional views schematically illustrating a fabrication process for forming a thin film transistor liquid crystal display according to a fifth preferred embodiment of this invention.
Figure 5:
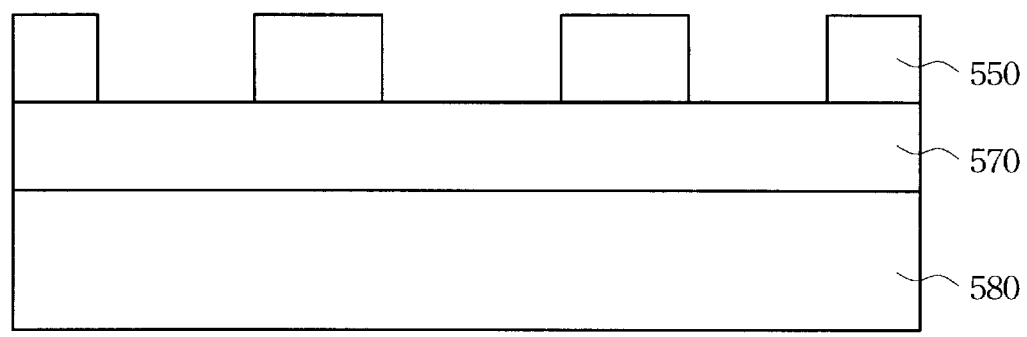
Figure 5:
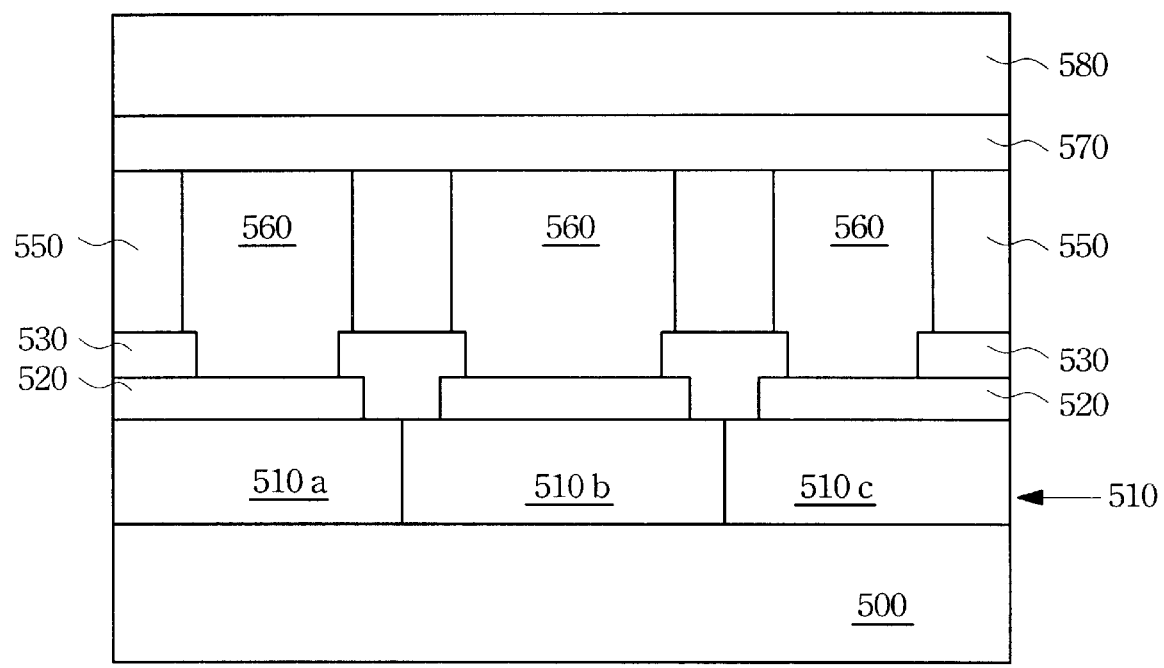

FIGS. 5A–5C are cross-sectional views schematically illustrating a fabrication process for forming a thin film transistor liquid crystal display according to a fifth preferred embodiment of this invention In FIG. 5A, a black matrix layer 510 is formed on a first substrate 500 having a TFT circuit thereon. The black matrix layer 510 is patterned to cover TFTs and metal lines of the TFT circuit and openings 520 are formed therein. Each opening 520 is corresponding to a pixel. The black matrix layer 510 is a material such as black resin, and its thickness is about 0.1–6 μm.

In FIG. 5B, a common electrode 570 is formed on a second substrate 580. A material of the second substrate 580 is preferred to be, for example, glass or quartz. The common electrode 570 is transparent, and a material of the common electrode 570 is, for example, indium tin oxide. The formation method of the common electrode 570 is, for example, sputtering.

A photoresist layer is formed to cover the common electrode 570. The photoresist layer is patterned to form spacers 550. The height of spacers 550 is preferred to be 1–10 μm, and the hardness of spacers 550 is preferred to be 2H–4H (pencil hardness) to maintain a constant value of the cell gap. A material of the photoresist is, for example, acrylic resin or epoxy resin such as OPTMER NN 500 or OPTMER NN700 sold by JSR Company. For example, the patterning method comprises photolithography or exposure followed by etching.

In FIG. 5C, the first substrate 500 and the second substrate 580 are parallel assembled together, and the pixel electrodes 540 and the spacers 550 are located between them. The lateral side of the cell gap between the first substrate 500 and the second substrate 580 is sealed except reserving an opening (not shown in the FIG. 5C) for liquid crystal injecting.

Liquid crystal is injected into the cell gap between the first substrate 500 and the second substrate 580 from the lateral opening to form a liquid crystal layer 560. The opening is sealed. The process of manufacturing TFT-LCD is completed.

From embodiment 5 described above, the black matrix and the color filter layer are moved to TFT substrate to form a color filter on TFT (COT) structure. Because all precise alignments are done on the TFT substrate, no alignment considerations are needed when the first substrate and the second substrate are assembled. Hence the COT structure can largely increase the production yield; moreover, it can be applied on the production techniques of fourth generation or above.

Besides, the locations of photoresist spacers are also moved from the first substrate to the second substrate as Embodiment 4 to reduce the production yield burden of the first substrate. The process window of the assembly step is about 10–20 $\mu$m. However, the process window of the 3.5$^{th}$ generation of LCD is only about 4–5 $\mu$m. Therefore the final production yield is still remained or even increased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of forming a liquid crystal, the method comprises:
   forming a black matrix layer on a first substrate having a control circuit thereon;
   forming a plurality of openings in the black matrix layer to expose the first substrate;
   forming a color filter layer on the black matrix layer;
   forming a plurality of pixel electrodes directly on the color filter to respectively align with each of the openings;
   forming a plurality of photoresist spacers on the first substrate to be located on portions of areas covered by the black matrix;
   parallel assembling the first substrate and a second substrate having a common electrode thereon, wherein the photoresist spacers and the common electrode are between the first substrate and the second substrate; and
   forming a liquid crystal layer between the first substrate and the second substrate.

2. The method of claim 1, wherein a method of forming the photoresist spacers comprises:
   forming a photoresist layer covering the pixel electrodes; and
   patterning the photoresist layer to form the photoresist spacers.

3. The method of claim 2, wherein the patterning method comprises exposure-developing.

4. The method of claim 2, wherein the patterning method comprises exposure-etching.

5. The method of claim 1, wherein a hardness of a material used to form the photoresist spacers is about 2H to about 4H.

6. The method of claim 1, wherein a height of the photoresist spacers is about 1 to about 10 $\mu$m.

7. The method of claim 1, wherein a material used to form the photoresist spacers comprises acrylic resin.

8. The method of claim 1, wherein a material used to form the photoresist spacers comprises epoxy-resin.

9. A method of forming a liquid crystal display, the method comprising:
   forming a black matrix layer on a first substrate having a control circuit thereon;
   forming a plurality of openings in the black matrix layer to expose the first substrate;
   forming a color filter layer on the black matrix layer;
   forming a plurality of pixel electrodes directly on the color filter layer to respectively align with each of the openings;
   forming a plurality of photoresist spacers on a second substrate having a common electrode thereon;
   parallel assembling the first substrate and the second substrate, wherein the photoresist spacers and the pixel electrodes are between the first substrate and the second substrate; and
   forming a liquid crystal layer between the first substrate and the second substrate.

10. The method of claim 9, wherein a method of forming the photoresist spacers comprises:
    forming a photoresist layer covering the common electrode; and
    patterning the photoresist layer to form the photoresist spacers.

11. The method of claim 10, wherein the patterning method comprises exposure-developing.

12. The method of claim 10, wherein the patterning method comprises exposure-etching.

13. The method of claim 9, wherein a hardness of a material used to form the photoresist spacers is about 2H to about 4H.

14. The method of claim 9, wherein a height of the photoresist spacers is about 1 to about 10 $\mu$m.

15. The method of claim 9, wherein a material used to form the photoresist spacers comprises acrylic resin.

16. The method of claim 9, wherein a material used to form the photoresist spacers comprises epoxy-resin.

17. A method of forming a liquid crystal display, comprising:
    forming a black matrix layer on a first substrate having a control circuit thereon;
    forming a plurality of openings in the black matrix layer to expose the first substrate;
    forming a color filter layer on the black matrix layer;
    forming a plurality of photoresist spacers on portions of areas covered by the black matrix layer;
    forming a plurality of pixel electrodes directly on the color filter layer to respectively align with each of the openings;
    parallel assembling the first substrate and a second substrate having a common electrode thereon, wherein the photoresist spacers and the common electrode are between the first substrate and the second substrate; and
    forming a liquid crystal layer between the first substrate and the second substrate.

18. The method of claim 17, wherein a method of forming the photoresist spacers comprises:
    forming a photoresist layer covering the color filter layer; and
    patterning the photoresist layer to form the photoresist spacers.

19. The method of claim 18, wherein the patterning method comprises exposure-developing.

20. The method of clam 18, wherein the patterning method comprises exposure-etching.

21. The method of claim 17, wherein a hardness of a material used to form the photoresist spacers is about 2H to about 4H.

22. The method of claim 17, wherein a height of the photoresist spacers is about 1 to about 4 µm.

23. The method of claim 17, wherein a method of forming the pixel electrodes comprising:

forming a transparent conductive layer on the color filter layer and the photoresist spacers; and removing portions of the transparent conductive layer on the photoresist spacers.

24. The method of claim 23, wherein the removal method comprises photolithography-etching.

25. A method of forming a liquid crystal display, comprising:

forming a black matrix layer on a first substrate having a control circuit thereon;

forming a plurality of first, second and third openings in the black matrix layer to exposure the first substrate;

forming a first color photoresist on the first substrate;

patterning the first color photoresist to form a plurality of first filter sheets respectively aligning with each of the first openings and a plurality of first spacers located on portions of areas covered by the black matrix;

forming a second color photoresist on the fist substrate;

patterning the second color photoresist to form a plurality of second filter sheets respectively aligning with each of the second openings and a plurality of second spacers respectively stacking on the first spacers;

forming a third color photoresist on the first substrate;

patterning the third color photoresist to form a plurality of third filter sheets respectively aligning with each of the third openings and a plurality of third spacers respectively stacking on the second spacers;

forming a plurality of pixel electrodes directly and respectively on the first, second and third filter sheets;

parallel assembling the first substrate and a second substrate having a common electrode thereon, wherein the photoresist spacers and the common electrode are between the first substrate and the second substrate; and forming a liquid crystal layer between the first substrate and the second substrate.

26. The method of claim 25, wherein a method of forming the pixel electrodes comprising:

forming a transparent conductive layer on the first, second and third filter sheets and the third spacers; and removing portions of the transparent conductive layer on the third spacers.

27. The method of claim 26, wherein the removal method comprises photolithography-etching.

28. A method of forming a liquid crystal display, comprising:

forming a color filter layer on a first substrate having a control circuit thereon, which is composed of a plurality of color filter sheets;

forming a plurality of pixel electrodes directly on the color filter sheets, which respectively align with each of the color filter sheets;

forming a black matrix layer on the pixel electrodes, which are located around the pixel electrodes;

forming a plurality of photoresist spacers on a second substrate having a common electrode thereon;

parallel assembling the first substrate and the second substrate, wherein the photoresist spacers and the black matrix are between the first substrate and the second substrate and are aligned with each other; and forming a liquid crystal layer between the first substrate and the second substrate.

29. The method of claim 28, wherein method of forming the photoresist spacers comprises:

forming a photoresist layer covering the common electrode; and patterning the photoresist layer to form the photoresist spacers.

30. The method of claim 29, wherein the patterning method comprises exposure-developing.

31. The method of claim 29, wherein the patterning method comprises exposure-etching.

32. The method of claim 28, wherein a hardness of a material used to form the photoresist spacers is about 2H to about 4H.

33. The method of claim 28, wherein a height of the photoresist spacers is about 1 to about 10 µm.

34. The liquid crystal display of claim 28, wherein a material used to form the photoresist spacer comprises acrylic resin.

35. The liquid crystal display of claim 28, wherein a material used to form the photoresist spacer comprises epoxy-resin.

36. The liquid crystal display of claim 28, wherein a height of the black matrix is about 0.1 to 6 µm.

* * * * *